Dec. 22, 1931.  E. FISHBURN  1,837,611

STOCK WATERING TANK

Filed April 26, 1927  2 Sheets-Sheet 1

Inventor

E. Fishburn.

By Lacey & Lacey, Attorneys

Dec. 22, 1931.  E. FISHBURN  1,837,611
STOCK WATERING TANK
Filed April 26, 1927  2 Sheets-Sheet 2
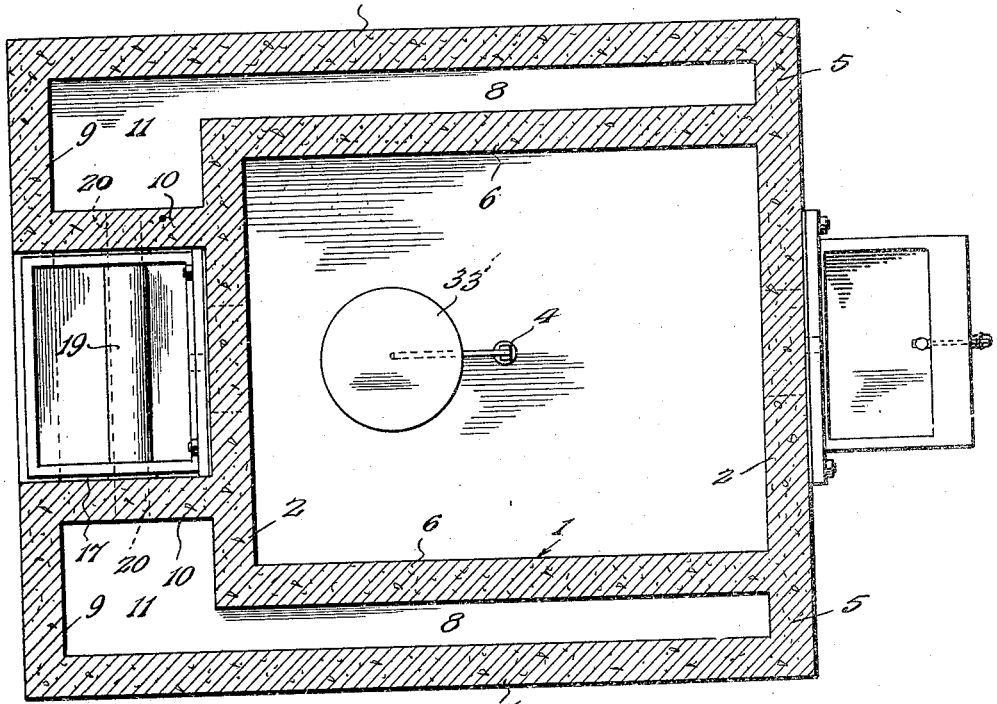
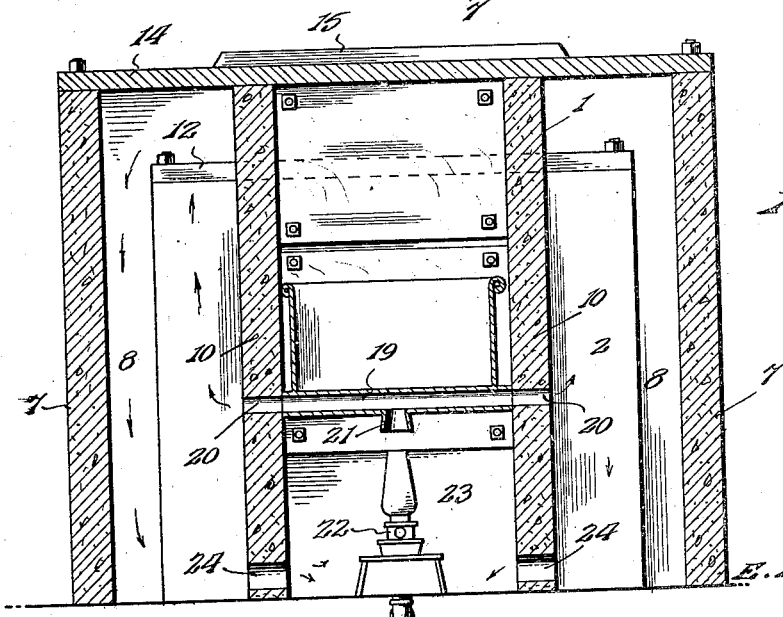
Inventor
E. Fishburn.
By Lacey & Lacey, Attorneys Patented Dec. 22, 1931

1,837,611

UNITED STATES PATENT OFFICE

EZRA FISHBURN, OF OVERBROOK, KANSAS

STOCK WATERING TANK

Application filed April 26, 1927. Serial No. 186,727.

The present invention is directed to improvements in stock watering tanks.

The primary object of the invention is to provide a device of this character so constructed that the water for the drinking trough will be prevented from freezing.

Another object of the invention is to provide a device of this kind constructed in such manner that the water will be maintained at a constant level in the drinking trough in order to assure at all times a plentiful supply for the stock.

With these and other objects in view, this invention resides in the novel features of construction, formation, combination and arrangement of parts to be hereinafter more fully described, claimed and illustrated in the accompanying drawings in which,—

Figure 3 is a sectional view on line 3—3 of Figure 2.

Figure 4 is a sectional view on line 4—4 of Figure 2.

Figure 1:
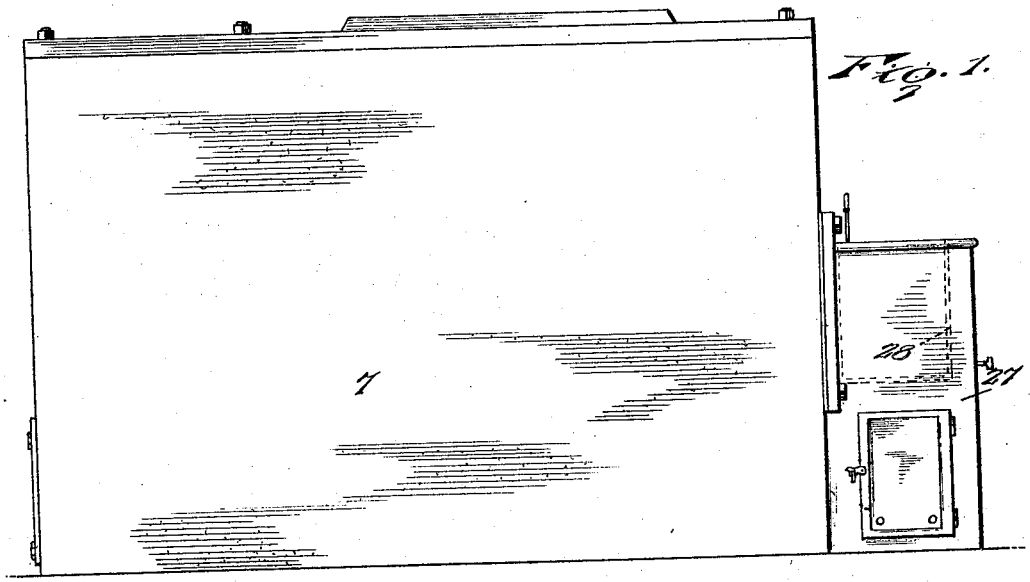
Figure 1 is a side elevation of the device.

Referring to the drawings, 1 designates the main supply tank, the end walls 2 thereof having ports 3, water being supplied automatically to the tank through the float controlled valve 4. The front end wall 2 has ends 5 which extend laterally beyond the forward ends of the side walls 6 of the tank, and merged therewith are the forward ends of the outer walls 7, which form in conjunction with the walls 6 flues 8. The rear ends of the walls 7 are formed with end sections 9 which merge with partitions 10—10, which in turn, merge with the end wall 2 at the rear of the tank, the chambers 11—11 thus produced communicating with the respective side flues 8. The tank 1, as well as the walls 7, end sections 9—9 and partitions 10—10 are preferably formed from cement, but wood, metal, or any other suitable material may be used. A cover 12 is provided which closes the upper end of the tank 1, said cover having a lid 13 removable, in order that access can be had to the interior of the tank 1. Supported upon the end walls of the tank, the walls 7, end sections 9—9 and partitions 10—10 is a cover 14 also provided with a removable lid 15, and since this cover is spaced above the cover 12 a transverse flue 16 is provided which has its ends communicating with the flues 8, the front and rear walls 2 of the tank constituting end closures for said flue.

A compartment 17 is provided between the partitions 10—10 and located therein is a water heating tank 18, the bottom of which is provided with a manifold 19, the ends thereof communicating with the inner ends of the openings 20—20 formed in said partitions, the outer ends of said openings being in communication with the chambers 11—11 and flues 8. The manifold is provided with a centrally disposed depending tube 21 under which the chimney of the lamp 22 is positioned in order that heat from the lamp will be directed into the manifold. The lamp is supported in any suitable manner in the compartment 23 defined by the bottom of the tank 18 and lower ends of the partitions 10—10, said partitions being provided near their lower ends with passages 24—24 which open into the chambers 11—11. The inner wall of the tank 18 is provided with a nipple 25 which engages in a packing 26 for registration with the adjacent port 3 in the tank 1, in order that water will be supplied thereto from the tank 1.

Figure 2:
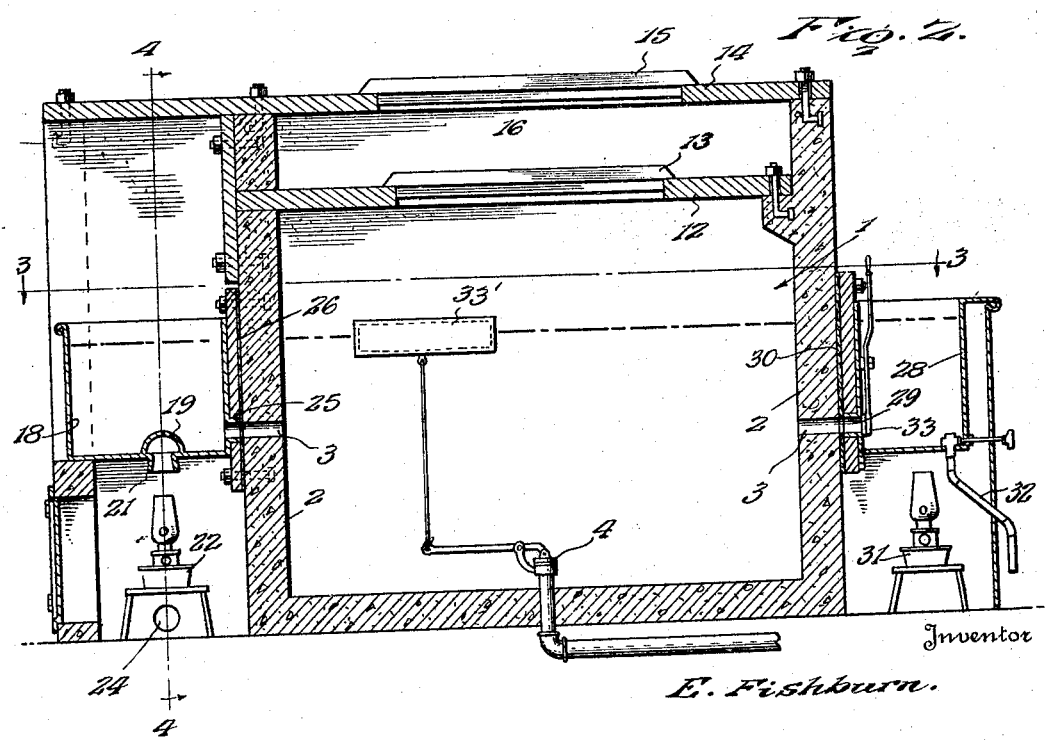
Figure 2 is a longitudinal sectional view therethrough.

A housing 27 is provided and partly supports a drinking trough 28 which is also provided with a nipple 29 for registration with the port 3 in the forward end wall 2, there being a packing 30 employed to assure a tight liquid proof joint. The trough may be integral with the housing 27, and the housing is provided with a door in order that the lamp 31 can be conveniently placed under the tank 28, as clearly shown in Figure 2 of the drawings. A valved pipe 32 leads from the trough 28 in order that the same can be drained when desired, there being a suitable valve 33 employed to close the port 3 during the draining of said trough.

It will be obvious that heat from the lamp 22 will enter the manifold 19 and after passing therefrom will circulate through the chambers 11—11, flues 8—8 and flue 16, and passages 24—24, thus maintaining the side walls 6 of the tank 1 in a warm state in order that the temperature of the water entering the tank 1 through the valve 4 will be raised, and since this water supplies the tank 18 and trough 28, the temperature thereof will be higher than that of the water contained in the tank 1. The tank 18 is primarily used for regulating the temperature of the water in the tank 1, which being thoroughly heated in the tank 18 will circulate through the tank 1 and trough 28. When it is desired to further raise the temperature of the water in the trough 28 the flame of the lamp 31 is adjusted in order to do so.

The float 33' will operate to maintain the water at the same level in the trough 28 and tank 18.

It will be observed that the construction is such that the water will be maintained in a cool state during summer months.

Having thus described the invention, I claim:

A stock waterer comprising a tank having intercommunicating spaces at its sides, top and one end, the tank being accessible from the top through covered openings formed in the walls defining the top space, partitions dividing the end space to form a vertical compartment which is in communication at its lower end with the side spaces, a heating tank intermediate the top and bottom of said compartment and in communication at its lower end with the main tank, a conduit in the bottom portion of the heating tank connecting with the side spaces, a lamp in the bottom part of the compartment, a tube depending from the conduit in line with the lamp chimney to receive the heat therefrom, a trough at the opposite end of the tank and in communication therewith, and a lamp beneath the trough.

In testimony whereof I affix my signature.

EZRA FISHBURN. [L. S.]